(12) United States Patent
Benz et al.

(10) Patent No.: US 6,338,525 B1
(45) Date of Patent: Jan. 15, 2002

(54) MULTISECTIONAL FRONT SECTION FOR A MOTOR VEHICLE SHELL BODY

(75) Inventors: Eberhard Benz, Gärtringen; Oliver Zolke, Ehningen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/576,854

(22) Filed: May 22, 2000

(30) Foreign Application Priority Data

May 22, 1999 (DE) ............................................. 199 23 737

(51) Int. Cl.⁷ .................................................. B60J 7/00
(52) U.S. Cl. ............... 296/203.02; 296/29; 296/190.08; 296/196
(58) Field of Search ............... 296/29, 190.08, 296/191, 192, 194, 196, 203.02

(56) References Cited

U.S. PATENT DOCUMENTS

| | | | | |
|---|---|---|---|---|
| 1,751,828 A | * | 3/1930 | Marshall | 296/194 |
| 2,664,308 A | * | 12/1953 | Appel | 454/159 |
| 4,391,465 A | * | 7/1983 | Piano | 296/208 |
| 4,669,777 A | * | 6/1987 | Harasaki et al. | 296/194 |
| 4,789,198 A | * | 12/1988 | Ide | 296/192 |
| 6,042,177 A | * | 3/2000 | Matushita et al. | 296/210 |

FOREIGN PATENT DOCUMENTS

| | | | | |
|---|---|---|---|---|
| DE | 1530796 | * | 6/1969 | 296/192 |
| DE | 3119572 | | 3/1982 | |
| DE | 3720847 | | 1/1989 | |
| DE | 4424288 | | 1/1996 | |
| DE | 19621943 | | 12/1997 | |
| JP | 2-303978 | * | 12/1990 | 296/192 |
| JP | 4-87887 | * | 3/1992 | 296/192 |
| JP | 5-69858 | * | 3/1993 | 296/192 |
| JP | 6-166381 | * | 6/1994 | 296/192 |
| JP | 6-227432 | * | 8/1994 | 296/192 |

* cited by examiner

*Primary Examiner*—Stephen T. Gordon
*Assistant Examiner*—Paul Chenevert
(74) *Attorney, Agent, or Firm*—Crowell & Moring LLP

(57) ABSTRACT

A multisectional sectional front section of a motor vehicle shell body is provided. At least two neighboring parts of the front section extended in a vehicle horizontal direction are attached to one other by connecting flanges which can especially be shifted perpendicularly to a longitude axis of the vehicle to accommodate tolerance differences in the spacing between the lateral sides of the vehicle body.

28 Claims, 4 Drawing Sheets

B-B

MULTISECTIONAL FRONT SECTION FOR A MOTOR VEHICLE SHELL BODY

BACKGROUND AND SUMMARY OF INVENTION

This application claims the priority of German patent document 19923737.9, filed May 22, 1999, the disclosure of which is expressly incorporated by reference herein.

The present invention relates to a multisectional front section for a shell body of a motor vehicle and especially a passenger motor vehicle.

The front section of the shell body of a passenger motor vehicle separates the passenger compartment from the front area of the body, in which the steering system and usually also the engine of the motor vehicle is housed. The front section is essentially arranged in the shell body vertically to the longitudinal direction of the vehicle. The front section is interspersed with various other prefabricated parts such as the steering column and ventilation ducts and for this reason is equipped with corresponding cutouts. Two pot-shaped indentations in the front form the leg room for passengers seated in the front of the motor vehicle. Front sections are usually manufactured as unitary pieces from a panel of sheet metal in a multi-stage high-tensile method and are reinforced in some spots by welding on additional sections of sheet metal.

Especially in the startup phase of the production of a motor vehicle, one sometimes finds that the non-tolerable imprecise fit necessitates a change in the dimensions of certain shell parts. If the front section is involved in such a change of dimensions, new high-tensile tools for the production of the front section are required. This results in considerable direct, as well as indirect expenses, since the manufacture of the high-tensile tools takes some time and therefore causes quite considerable delays in the beginning of the mass production of the motor vehicle.

A multisectional front consisting of an upper and a lower part is known from patent DE 37 20 847 C2 (corresponding to U.S. Pat. No. 4,900,082), in which the lower part forms the upper shell of a fork bearer in one of the embodiments. The upper and lower parts are attached to one another via connecting flanges, which can be shifted along planes running parallel to the floor of the motor vehicle. Both parts are manufactured from a high-tensile symmetrical pot, which is separated along a plane of symmetry. Afterwards, the separate pot parts are each swung around a vertical axis by 90° and welded together to the upper and lower parts. Because it is made up of several parts, the front can consist of sheet metal of varying thickness, which allows for a reduction of weight, while taking into consideration the non-homogeneous spatial distribution of the force acting on the vehicle in the case of an impact. If, as mentioned above, a change in the dimensions of the front becomes necessary, only one of the two parts in the set of high-tensile tools must be replaced.

The task of the present invention is to further improve this type of motor vehicle front section, especially as regards the costs resulting from an additional change in the dimensions of the front section.

The present invention solves this task by providing a front section of a motor vehicle shell body, wherein at least two neighboring parts of the front section arranged in a vehicle's horizontal axis are attached to one another via connecting flanges, which can essentially be shifted perpendicularly to a longitudinal axis of the vehicle. In this front section, at least two neighboring parts of the front section arranged along the vehicle's horizontal axis are attached to one another via connecting flanges, which can essentially be moved vertically to the vehicle's longitudinal axis. This constructive design allows neighboring parts of the front section to be shifted relative to one other along a horizontal axis in order to compensate for an imprecise fit. Therefore, it is often not necessary to manufacture new high-tensile tools if there is a change in dimensions. Instead, the parts of the front section produced with the existing tools are simply arranged somewhat differently than originally planned and welded together.

Especially if the front section is composed of more than two such front section parts, there are additional advantages in terms of production engineering. For example, the individual front section parts can be manufactured in significantly fewer tensile steps, since the individual parts are less spatially complex in comparison to a one or two-piece front section.

In order to allow for the parts to be shifted along the vehicle's horizontal axis, in accordance with certain preferred embodiments of the invention, the at least two neighboring parts arranged along the vehicle's horizontal axis can be connected to at least one neighboring front section part arranged along the vehicle's vertical axis via connecting flanges, which can essentially be shifted vertically in relation to the vehicle's horizontal axis. Alternatively, in accordance with certain preferred embodiments of the invention, they can also be arranged to move essentially vertically to the vehicle's vertical axis. Which of the two variations is to be preferred essentially depends on whether any additional changes in dimensions are expected to be made along the vehicle's vertical or longitudinal axis.

In certain preferred embodiments of the invention, the front section parts neighboring the A-column of the shell body are connected to this A-column via connecting flanges, which can essentially be shifted vertically in relation to the vehicle's horizontal axis. This allows for movement not only along the vehicle's longitudinal direction, but along the vehicle's vertical axis as well.

In certain preferred embodiments of the invention, the front section parts and the neighboring windshield transverse of the shell body are connected to one another via connecting flanges, which can essentially be moved along the vehicle's vertical axis. This arrangement of the connecting flanges allows for movement relative to the windshield transverse as well as along the vehicle's longitudinal and horizontal axes.

In certain preferred embodiments of the invention, front section parts and a neighboring windshield transverse of the shell body are connected to one another via connecting flanges, which can essentially be moved vertically along the vehicle's vertical axis. This arrangement of the connecting flanges allows for movement relative to the windshield transverse along the vehicle's longitudinal and horizontal axes.

In certain preferred embodiments of the invention, a front section part and a neighboring vehicle floor of the shell body are connected to one another via connecting flanges, which can essentially be shifted vertically along the vehicle's vertical axis. This arrangement of the connecting flanges allows for movement relative to the vehicle floor along the vehicle's longitudinal and horizontal axes.

In certain preferred embodiments of the invention, front section parts and a neighboring longitudinal load bearing member of the vehicle's shell body are connected to one another via connecting flanges, which can essentially be shifted vertically along the vehicle's longitudinal axis. This arrangement of the connecting flanges allows for movement relative to the longitudinal load bearing member of the vehicle's shell body along the vehicle's horizontal and vertical axes.

In certain preferred embodiments of the invention, front section parts and a neighboring steering wheel connection of the shell body are connected to one another via connecting flanges, which can essentially be moved vertically along the vehicle's vertical axis. This arrangement of the connecting flanges allows for movement relative to the steering wheel connection along the vehicle's longitudinal and horizontal axes.

In certain preferred embodiments of the invention, in its assembled state the front section includes an upper section, a middle section and a lower section, in which the upper section is composed of a left and a right upper section and the middle section is composed of a left, a middle and a right midsection.

As it turns out, such a division of the front section is an especially favorable compromise between creating versatile possibilities of balancing several front section parts on the one hand, and an overall reduction in the number of prefabricated parts on the other.

In certain preferred embodiments of the invention, the at least two front section parts are made of different thickness of sheet metal. The thickness of the individual front section parts can be optimally adjusted to the various forces that the individual areas of the front section will have to withstand. This allows for a significant reduction in weight. In addition, the welding on of reinforcement sheet metal can at least partially be eliminated.

Other objects, advantages and novel features of the present invention will become apparent from the following detailed description of the invention when considered in conjunction with the accompanying drawings.

DETAILED DESCRIPTION OF THE DRAWINGS

The figures contain a coordinate system, which shows the orientation of the prefabricated parts shown here following assembly in the motor vehicle. X represents the vehicle's longitudinal axis, Y represents the vehicle's horizontal axis and Z represents the vehicle's vertical axis running vertically to the ground level.

Figure 1:
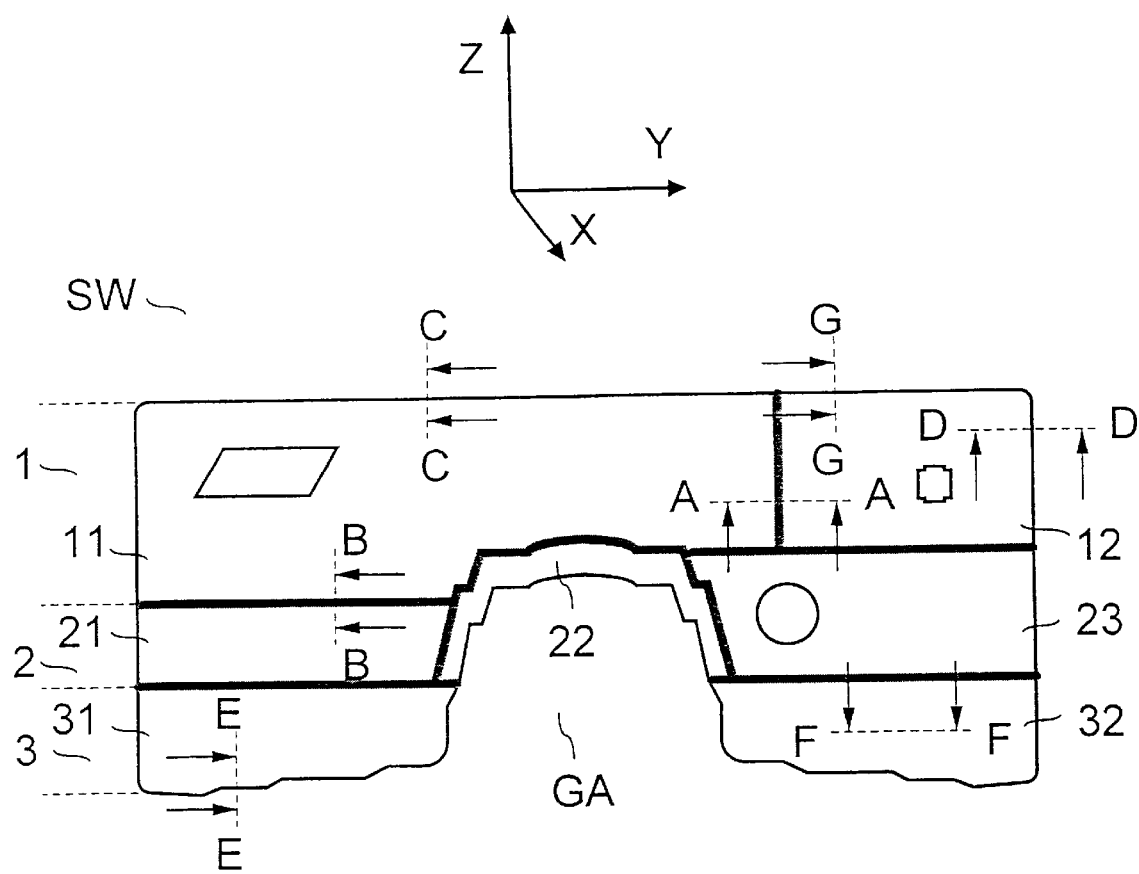
FIG. 1 shows a simplified schematic top view of a front section, constructed according to preferred embodiments of the invention.

FIG. 1 shows a top view of a multisectional front section SW of the shell body of a passenger motor vehicle, in which the front area is turned toward the observer. Protrusions and indentations of the front section along the vehicle's longitudinal axis X, for example the protrusions forming the leg room of the passenger compartment, are not recognizable in FIG. 1. The front section contains numerous bores not shown in FIG. 1, that serve the attachment of prefabricated parts in the area of the front section and in the passenger compartment. In addition, there are several large cutouts through which other prefabricated parts such as the steering column or ventilation ducts can penetrate. Only a few examples of these cutouts are shown in FIG. 1 and are not described in more detail. When assembled, the front section is bordered on the left and right by the A-column of the shell body, while on the upper side of the front section there is a transverse bearing for the windshield. On its underside, the front section is welded to the vehicle base. There are also two longitudinal load bearing members protruding into the front area and a steering connection for receiving the steering column mounting arranged on the side facing the observer.

Along the vehicle's vertical axis Z, front section SW is subdivided into three sections 1, 2 and 3, each of which in turn consists of several parts. Section 1 includes-seen from the front view-an upper left section 11 and an upper right section 12; section 2 contains a left midsection 21, a middle midsection 22 and a right midsection 23. Section 3 is formed from left and right lower sections 31 and 32, which, however, are separated by a gear cutout GA and are therefore not directly connected to one another.

The front section parts consist of formed pieces of sheet metal that are shaped from sheets of sheet metal using a high-tensile method, and which are provided with connecting flanges all around their edges. During production of the front section, the connecting flanges are brought into contact along the front section parts and are welded together.

Figure 2:
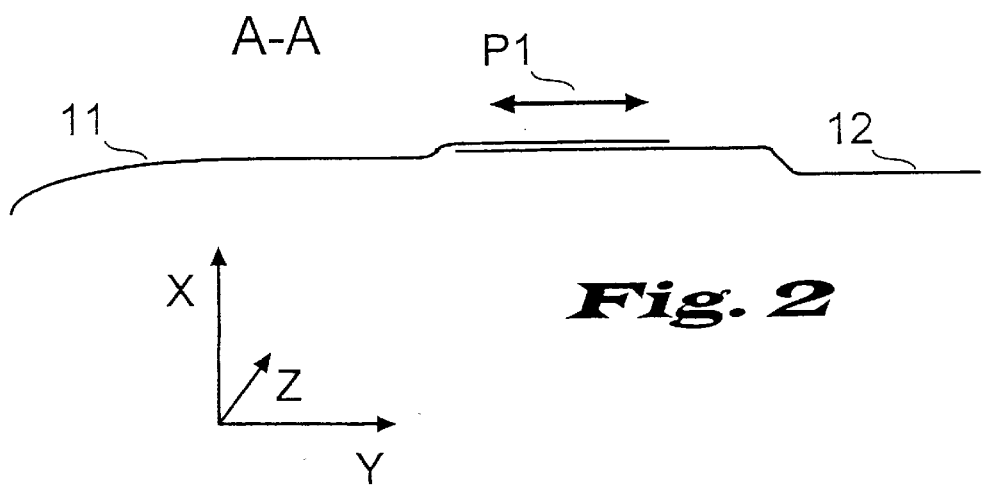
FIG. 2 shows a cross-section A—A of the front section shown in FIG. 1.

The spatial arrangement of the connecting flanges is explained in more detail below on the basis of the remaining figures. Cross section A—A in FIG. 2 shows neighboring front section parts 11 and 12 in the vehicle's horizontal axis. Here, the connecting flanges can be moved along the Y-Z axis, i.e., vertically to the vehicle's longitudinal axis X. In this way, the two front section parts 11 and 12 can be moved toward one another, especially in the direction of the arrow Pl before being welded together. If, for example, it becomes clear in the startup phase of the vehicle production that the actual distance of the A-column bordering the front section in the vehicle's horizontal axis Y deviates slightly from the desired value calculated during design, in accordance with the present invention it is possible to readjust the front section without having to alter the dimensions of the front section parts. Since the two front section parts 11 and 12 can be moved toward each other before welding, especially along the connecting flanges in the vehicle's horizontal axis Y, to create a balance it is only necessary to weld the two front section parts in a position in the Y-axis that is appropriately altered in comparison to the original desired value.

Movement of the front section parts 11 and 12 along the vehicle's horizontal axis requires suitably molded connecting flanges to the neighboring front section parts in the vehicle's vertical axis Z as well, i.e., to the front section parts 21, 22 and 23. Possible variations of these connecting flanges can be seen in FIGS. 3a and 3b, both of which show the neighboring front section parts 11 and 21 along the vehicle's vertical axis in a cross-section B—B. In the variation in accordance with FIG. 3a, the connecting flanges can be moved in a direction parallel to that of the connecting flanges of the neighboring front section parts, i.e., in the Y-Z axis and therefore vertically to the vehicle's longitudinal axis.

Figure 3A:
FIG. 3a shows a cross-section B—B of a first variation of the front section shown in FIG. 1.
Figure 3B:
FIG. 3b shows a cross-section B—B of a second variation of the front section shown in FIG. 1.

In the variation in accordance with FIG. 3b, however, the front section parts are molded in such a way that the connecting flanges move along the X-Y axis, i.e., parallel to the ground level of the motor vehicle. In order to allow for the desired movement along the vehicle's horizontal axis it suffices, of course, if these connecting flanges can be moved parallel to the Y-axis. However, there are no restrictions of the orientation of movement relative to the X-axis and Z-axis; in this respect, the variations shown in FIG. 3a and 3b are two extreme cases, but in no way limit the possible embodiments of the present invention.

Figure 4:
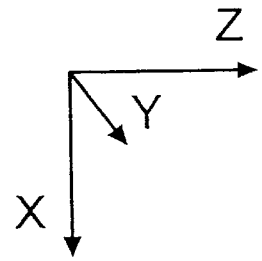
FIG. 4 shows a cross-section C—C of the front section shown in FIG. 1.
Figure 4:
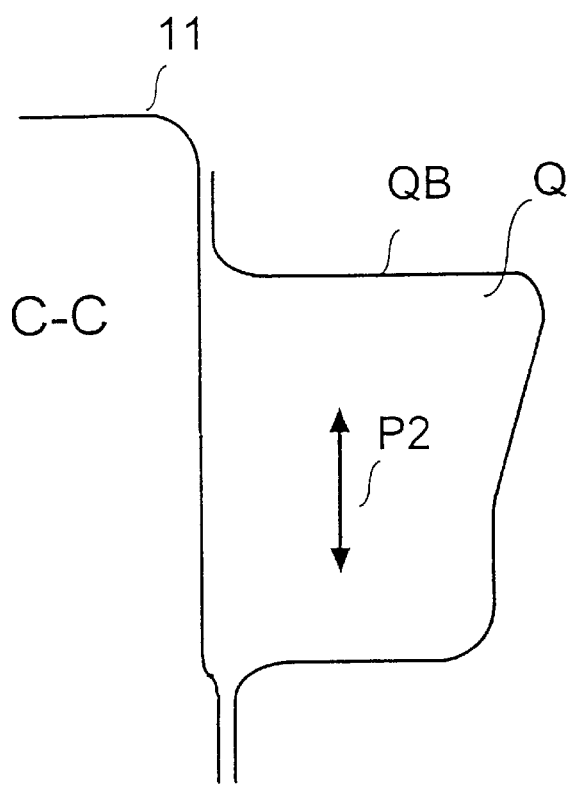
Figure 4:
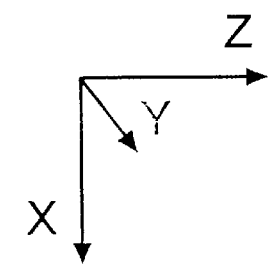

The movement of the front section parts relative to the prefabricated parts neighboring the front section must also be ensured. Cross-section C—C in FIG. 4 shows a two-shelled transverse Q bearing the windshield, whose upper shell in the embodiment shown here is formed by a sheet metal transverse uppershell QB and whose lower shell is formed by a connecting flange of the left upper section 11. Here, the connecting flanges can be moved along the X-Y axis, i.e., vertically to the vertical axis Z. In this way, the left upper section 11 can be moved along the vehicle's horizontal axis Y relative to the sheet metal transverse before welding, which can create a balance in the case of an imprecise fit.

Figure 5:
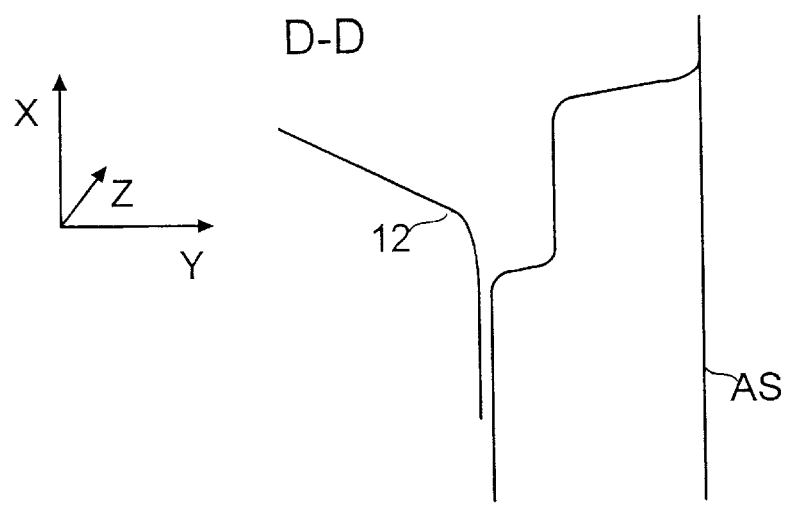
FIG. 5 shows a cross-section D—D of the front section shown in FIG. 1.

Cross-section D—D in FIG. 5 shows the connecting flanges between the right upper section 12 and the right A-column AS of the shell body. The connecting flanges can be moved along the X-Z axis, i.e., vertically to the vehicle's horizontal axis Y. Movement along the vehicle's horizontal axis is not possible here since the A-column is fixed and is a lateral restriction of the shell body. The right upper section 12 can be moved along the vehicle's longitudinal axis X and along the vehicle's vertical axis Z before welding. The individual possible movements depend of course on the formation of the connecting flanges between the pieces making up the front section.

If the right upper section 12 is connected to the right midsection 23 lying underneath it, via connecting flanges shown in FIG. 3a, upper section 12 can be moved along the vehicle's vertical axis before welding. However, in the variation shown in FIG. 3b, the movement is along the vehicle's longitudinal axis X.

Figure 6:
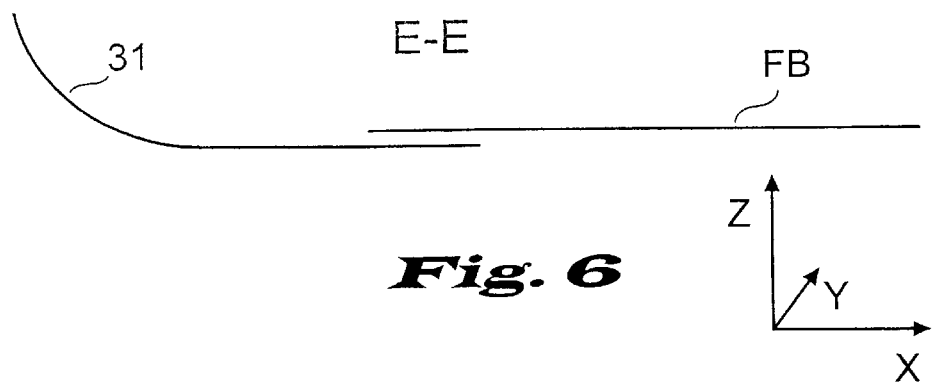
FIG. 6 shows a cross-section E—E of the front section shown in FIG. 1.
Figure 7:
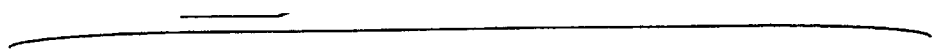
FIG. 7 shows a cross-section F—F of the front section shown in FIG. 1.
Figure 7:
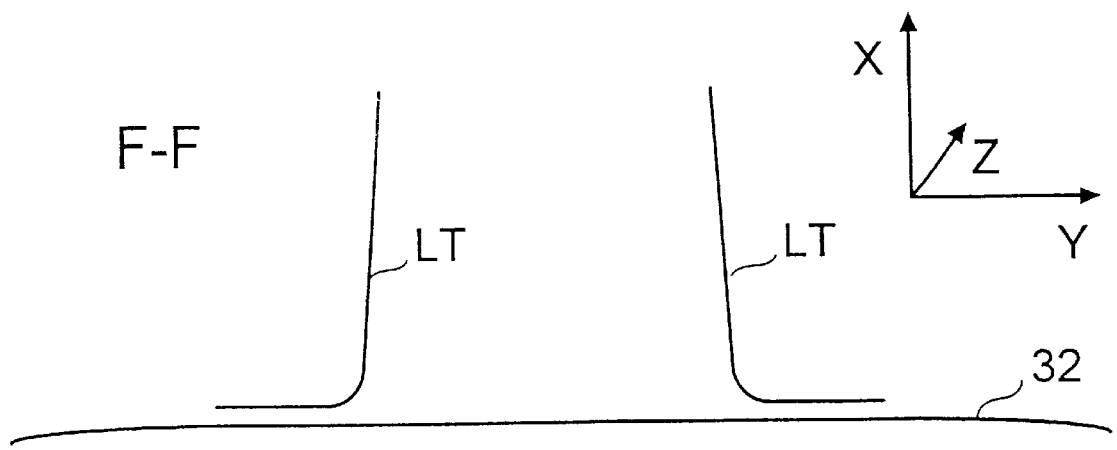
Figure 8:
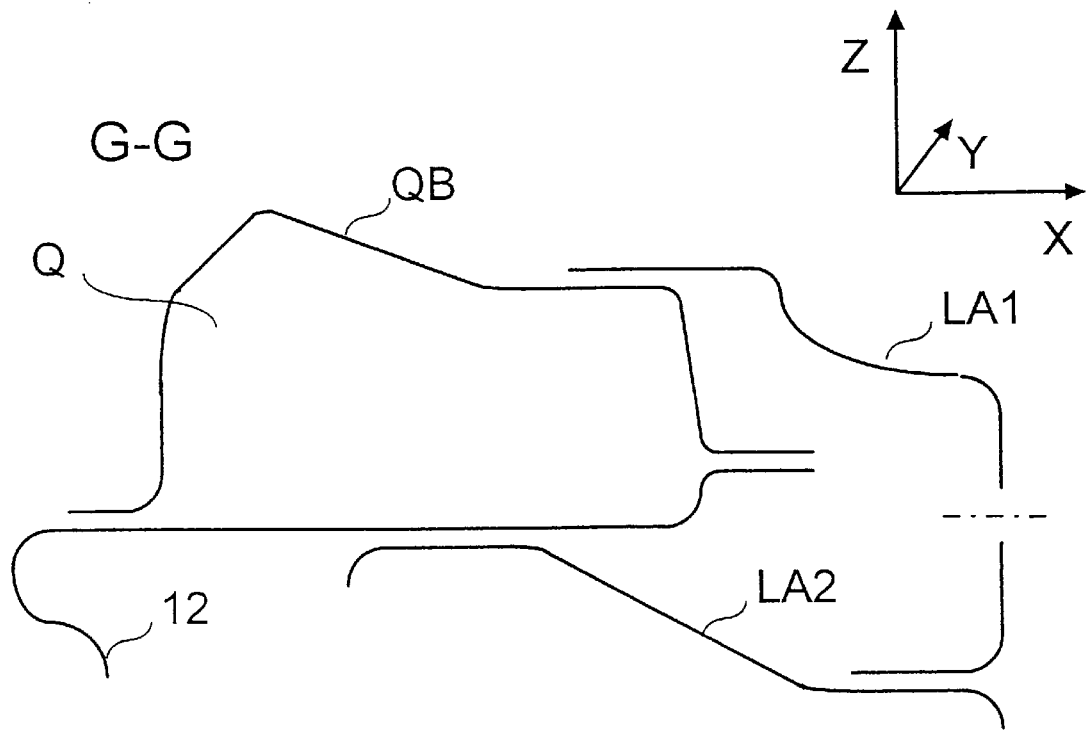
FIG. 8 shows a cross-section G—G of the front section shown in FIG. 1.

Cross-section E—E in FIG. 6 shows the connecting flanges between left lower section 31 and a vehicle base FB. The connecting flanges can be moved along the X-Y axis, i.e. vertically to the vehicle's vertical axis Z. Cross-section F—F in FIG. 7 shows the connecting flanges between right lower section 32 and a vehicle longitudinal load bearing member LT. The connecting flanges can be moved along the Y-Z axis, i.e., vertically to the vehicle's longitudinal axis X. Finally, cross-section G—G in FIG. 8 shows the connecting flanges between the right upper section 12, an upper shell QB of a two-shelled transverse Q bearing the windshield as well as a steering wheel connection, which includes two sheet metal parts LA1 and LA2. All of the connecting flanges can be moved along the X-Y axis, i.e., vertically to the vehicle's vertical axis.

It is understood that the directions referred to above are only approximate descriptions of the orientation of movement, since front sections often contain extremely curved areas, in which the front section does not run along the Y-Z axis as assumed here. In these areas, the directions stated above are to be changed accordingly.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A multisectional front section of a motor vehicle shell body,
   wherein at least two neighboring parts of the front section arranged in a vehicle's horizontal axis are attached to one another via connecting flanges, which can essentially be shifted perpendicularly to a longitudinal axis of the vehicle,
   wherein in the assembled condition, the front section consists of an upper section, a middle section and a lower section, in which the upper section is composed of a left and a right upper section, and the middle section is composed of a left, a middle, and a right midsection.

2. A front section in accordance with claim 1, wherein sheet metal in the two parts of the front section are of two different thicknesses.

3. A multisectional front section of a motor vehicle shell body,
   wherein at least two neighboring parts of the front section arranged in a vehicle's horizontal axis are attached to one another via connecting flanges, which can essentially be shifted perpendicularly to a longitudinal axis of the vehicle,
   wherein said at least two neighboring parts of the front section arranged in the vehicle's horizontal axis are connected to at least one neighboring part of the front section arranged in a vehicle's vertical axis, via connecting flanges, which can essentially be shifted perpendicularly to the longitudinal axis of the vehicle.

4. A front section in accordance with claim 3, wherein said neighboring parts of the front section are connected with an A-column of the vehicle shell body via connecting flanges which can essentially be shifted perpendicularly to the horizontal axis of the vehicle.

5. A front section in accordance with claim 3, wherein said neighboring parts of the front section are connected with a windshield transverse of the vehicle shell body via connecting flanges, which can essentially be shifted perpendicularly to the longitudinal axis of the vehicle.

6. A front section in accordance with claim 3, wherein said neighboring parts of the front section are connected with a vehicle floor of the vehicle shell body via connecting flanges, which can essentially be shifted perpendicularly to the longitudinal axis of the vehicle.

7. A front section in accordance with claim 3, wherein said neighboring parts of the front section are connected with a vehicle longitudinal load bearing member of the vehicle shell body via connecting flanges, which can essentially be shifted perpendicularly to the horizontal axis of the vehicle.

8. A front section in accordance claim 3, wherein said neighboring parts of the front section are connected with a steering wheel connector of the vehicle shell body via connecting flanges, which can essentially be shifted perpendicularly to the horizontal axis of the vehicle.

9. A front section in accordance with claim 3, wherein in the assembled condition, the front section consists of an upper section, a middle section and a lower section, in which the upper section is composed of a left and a right upper section, and the middle section is composed of a left, a middle, and a right midsection.

10. A front section in accordance with claim 3, wherein sheet metal in the two parts of the front section are of two different thicknesses.

11. A multisectional front section of a motor vehicle shell body,
wherein at least two neighboring parts of the front section arranged in a vehicle's horizontal axis are attached to one another via connecting flanges, which can essentially be shifted perpendicularly to a longitudinal axis of the vehicle,
wherein said at least two neighboring parts of the front section arranged in the vehicle's horizontal axis are connected with at least one matching neighboring part of the front section arranged in the vertical axis of the vehicle, via connecting flanges, which can essentially be shifted vertically to the longitudinal axis of the vehicle.

12. A front section in accordance with claim 11, wherein said neighboring parts of the front section are connected with an A-column of the vehicle shell body via connecting flanges which can essentially be shifted perpendicularly to the horizontal axis of the vehicle.

13. A front section in accordance with claim 11, wherein said neighboring parts of the front section are connected with a windshield transverse of the vehicle shell body via connecting flanges, which can essentially be shifted perpendicularly to the longitudinal axis of the vehicle.

14. A front section in accordance with claim 11, wherein said neighboring parts of the front section are connected with a vehicle floor of the vehicle shell body via connecting flanges, which can essentially be shifted perpendicularly to the longitudinal axis of the vehicle.

15. A front section in accordance with claim 11, wherein said neighboring parts of the front section are connected with a vehicle longitudinal load bearing member of the vehicle shell body via connecting flanges, which can essentially be shifted perpendicularly to the horizontal axis of the vehicle.

16. A front section in accordance claim 11, wherein said neighboring parts of the front section are connected with a steering wheel connector of the vehicle shell body via connecting flanges, which can essentially be shifted perpendicularly to the horizontal axis of the vehicle.

17. A front section in accordance with claim 11, wherein in the assembled condition, the front section consists of an upper section, a middle section and a lower section, in which the upper section is composed of a left and a right upper section, and the middle section is composed of a left, a middle, and a right midsection.

18. A front section in accordance with claim 11, wherein sheet metal in the two parts of the front section are of two different thicknesses.

19. A multi-part front wall unit for separating a passenger compartment from a front area of a motor vehicle comprising:
at least two neighboring parts of the front wall unit being arranged to extend in a horizontal axis of the motor vehicle; and
connecting flanges arranged on the at least two neighboring parts such that the two neighboring parts are shiftable relative to one another and capable of being attached along the connecting flanges;
wherein a dimension of the front wall unit measured perpendicularly to the longitudinal axis is capable of being changed to provide a precise fit of the front wall unit to the motor vehicle when attached thereto, by shifting at least two neighboring parts of the front wall unit perpendicularly to a longitudinal axis of the motor vehicle during assembly of the front wall unit.

20. The multi-part front wall unit according to claim 19, wherein said at least two neighboring parts of the front wall unit are connected to at least one neighboring part of the front wall unit arranged in the motor vehicle's vertical axis, via connecting flanges, which can be shifted substantially perpendicularly to the longitudinal axis of the motor vehicle.

21. The multi-part front wall unit according to claim 19, wherein said neighboring parts of the front wall unit are connected with an A-column of the motor vehicle via connecting flanges which can be shifted substantially perpendicularly to the horizontal axis of the vehicle.

22. The multi-part front wall unit according to claim 19, wherein said at least two neighboring parts of the front wall unit are connected with a windshield transverse of the motor vehicle via connecting flanges, which can be shifted substantially perpendicularly to the longitudinal axis of the vehicle.

23. The multi-part front wall unit according to claim 19, wherein said at least two neighboring parts of the front wall unit are connected with a floor of the motor vehicle via connecting flanges, which can be shifted substantially perpendicularly to the longitudinal axis of the vehicle.

24. The multi-part front wall unit according to claim 19, wherein said at least two neighboring parts of the front wall unit are connected with a longitudinal load bearing member of the motor vehicle via connecting flanges, which can be shifted substantially perpendicularly to the horizontal axis of the vehicle.

25. The multi-part front wall unit according to claim 19, wherein said at least two neighboring parts of the front wall unit are connected with a steering wheel connector of the motor vehicle via connecting flanges, which can be shifted substantially perpendicularly to the horizontal axis of the vehicle.

26. The multi-part front wall unit according to claim 19, wherein said at least two neighboring parts of the front wall unit are made of sheet metal and each have a different thickness.

27. A method of assembling a multi-part front wall unit for separating a passenger compartment from a front area of a motor vehicle, wherein at least two neighboring parts of the front section arranged in a vehicle's horizontal axis are attached to one another via connecting flanges, which can essentially be shifted perpendicularly to a longitudinal axis of the vehicle, said method comprising:
shifting at least one of the at least two neighboring parts perpendiculary to the longitudial axis of the vehicle, and welding the shifted part to one of the other neighboring parts.

28. A method of assembling a multi-part front wall unit for separating a passenger compartment from a front area of a motor vehicle comprising:
providing at least two neighboring parts which are arranged to extend in a horizontal axis of the motor vehicle;
providing connecting flanges on the at least two neighboring parts such that the two neighboring parts are shiftable relative to one another and capable of being attached along the connecting flanges; and
adjusting a dimension of the front wall unit measured perpendicularly to the longitudinal axis to achieve a precise fit of the front wall unit to the motor vehicle when attached thereto by shifting the at least two neighboring parts of the front wall unit perpendicularly to a longitudinal axis of the motor vehicle.

* * * * *